United States Patent [19]

Giles et al.

[11] Patent Number: 5,015,875
[45] Date of Patent: May 14, 1991

[54] TOGGLE-FREE SCAN FLIP-FLOP

[75] Inventors: Grady L. Giles; Jesse R. Wilson, both of Austin, Tex.

[73] Assignee: Motorola, Inc., Schaumburg, Ill.

[21] Appl. No.: 444,208

[22] Filed: Dec. 1, 1989

[51] Int. Cl.[5] ..................... H03K 3/284; H03K 19/007
[52] U.S. Cl. ................................... 307/272.2; 307/442
[58] Field of Search ................... 307/272.2, 272.1, 442

[56] References Cited

U.S. PATENT DOCUMENTS 4,495,629 1/1985 Zasio et al. ............................ 377/70
4,879,718 11/1989 Sanner ............................. 307/272.2

OTHER PUBLICATIONS

"An Enhancement to LSSD and Some Applications of LSSD in Reliability, Availability, and Serviceability", DasGupta et al., The Eleventh Annual International Symposium on Fault-Tolerant Computing, Jun. 24-26, 1981, pp. 32-34.

Primary Examiner—Stanley D. Miller
Assistant Examiner—R. Roseen
Attorney, Agent, or Firm—Charlotte B. Whitaker

[57] ABSTRACT

A toggle-free scan flip-flop (TFSFF) is provided which is designed for use during a test mode scan operation. The toggle-free scan flip-flop has the capability of not toggling its parallel output during test mode scan operation. The TFSFF uses a master latch, which is controlled by a scan multiplexor, to selectively update two alternate slave latches. Switching logic controls the determination of which alternate slave latch is updated with the incoming data signal. An existent scan enable (SE) signal controls the switching logic, and thus, the TFSFF design requires no additional control signals for its operation. During the scan test mode, the data is clocked through the TFSFF from a Scan-Data-In terminal, and out the Scan-Data-Out terminal, without affecting the system data output Q. The shift sequence is followed by a capture interval, during which the Q output is automatically updated with the desired data to test the target logic. Thus, the logic under test is not affected by the loading of the scan test vector, since the parallel system output Q of the TFSFF does not toggle during the shifting sequence.

28 Claims, 4 Drawing Sheets

TOGGLE-FREE SCAN FLIP-FLOP

FIELD OF INVENTION

This invention relates generally to the testing of integrated circuits, and more particularly, to conventional scan path design.

BACKGROUND OF THE INVENTION

Structured testing of the combinational logic systems, used to implement VLSI circuits, requires the use of test patterns (vectors) consisting of a predetermined set of input stimuli for the combinational logic block under test. Typically, these test patterns are generated using some form of computer automated test pattern generation (ATPG) software. Accordingly, the optimum structured test methodology is one designed to facilitate its use with the ATPG software. One such structured test method uses scan path flip-flops to implement a shift path for loading a test vector, and applying the test vector of a logic block under test. In a conventional scan path design, during test mode scan operation, the flip-flops' parallel outputs are constantly changing in a way that reflects the scan data (test vector) being shifted through the scan path. Typically, the flip-flop's system logic parallel output and its scan output are the same output. In cases where the flip-flop's parallel outputs drive normal combinational logic, the fact that the parallel outputs are the same as the scan output does not present a problem. If however, the logic being driven by this essentially random data generates signals that activate asynchronous sets or resets of scan path flip-flops, some facility is required to prevent the spurious corruption of scan data. This phenomenon is frequently referred to as the "bare bit" problem.

The capabilities and limitations of Automatic Test Pattern Generation (ATPG) software impose additional constraints on the design of scan path flip-flops. For example, in state of the art structured design, there is a design rule that prohibits the use of asynchronous resets, except for initialization (i.e. as necessary for system power-up), and this exception applied only if the initilization is activated from a primary input. Resets for purposes other than initilization are thus generally limited to affecting the flip-flops synchronously. The primary purpose of this design rule is to address the bare bit problem.

Some prior art solutions have employed special test control signals to seize control of the scan flip-flop's asynchronous set and reset signals during the test mode, and thus, resolve the bare bit problem. Typically, these prior art solutions involve seizing control of the reset signal in the test mode with a boundary-scan cell that serves no additional function in the system. Such boundary-scan cells require a special control signal that it not used for any other purpose. Thus, the generation of the special test control signal requires additional test system overhead, and therefore, in some test environments these prior art solutions are not feasible.

SUMMARY OF THE INVENTION

Accordingly, it is an object of the present invention to provide a scan flip-flop which does not toggle its parallel output during test mode scan operation, hereinafter referred to as a Toggle-Free Scan Flip-Flop (TFSFF).

It is another object of the present invention to provide an asynchronously setable or resetable scan flip-flop that accommodates constraints imposed by the design of the TFSFF.

Yet another object of the present invention is to provide a scan flip-flop for use with Automatic Test Pattern Generation (ATPG) software.

Yet another object of the present invention is to provide a scan flip-flop which allows the application of uncorrelated test vector sequences to a combinational logic block under test.

These and other objects are achieved in a toggle-free scan flip-flop, comprising a latching portion for receiving a data input signal, and for providing a latch data output signal, the latching portion including a first slave latch, and a second slave latch; a multiplexor, coupled to said latching portion, for selectively providing the data input signal to the latching means, in response to a control signal, the multiplexor, operable in a first mode of operation, for coupling a scan data input signal to the latching portion, and operable in a second mode of operation, for coupling a system data input signal to the latching means, the first mode of operation and the second mode of operation being determined by the logic state of said control signal; and switching logic, coupled to the multiplexor, and the latching portion, for selectively transferring the latch data output signal from the latching portion to the first slave latch, in response to the control signal being in the first logic state, and for transferring the latch data output signal from the slave latch circuit to an input of the second slave latch, in response to the control signal being in said second logic state; whereby, in the first mode of operation, wherein the scan data input signal is clocked through said latching portion and provided at an output of the first slave latch, the value stored by the second slave latch does not toggle, and in the second mode of operation, wherein the system data input signal is clocked through the latching portion and provided at an output of the second slave latch, the value stored by the first slave latch does not toggle.

DETAILED DESCRIPTION OF THE INVENTION

Figure 1:
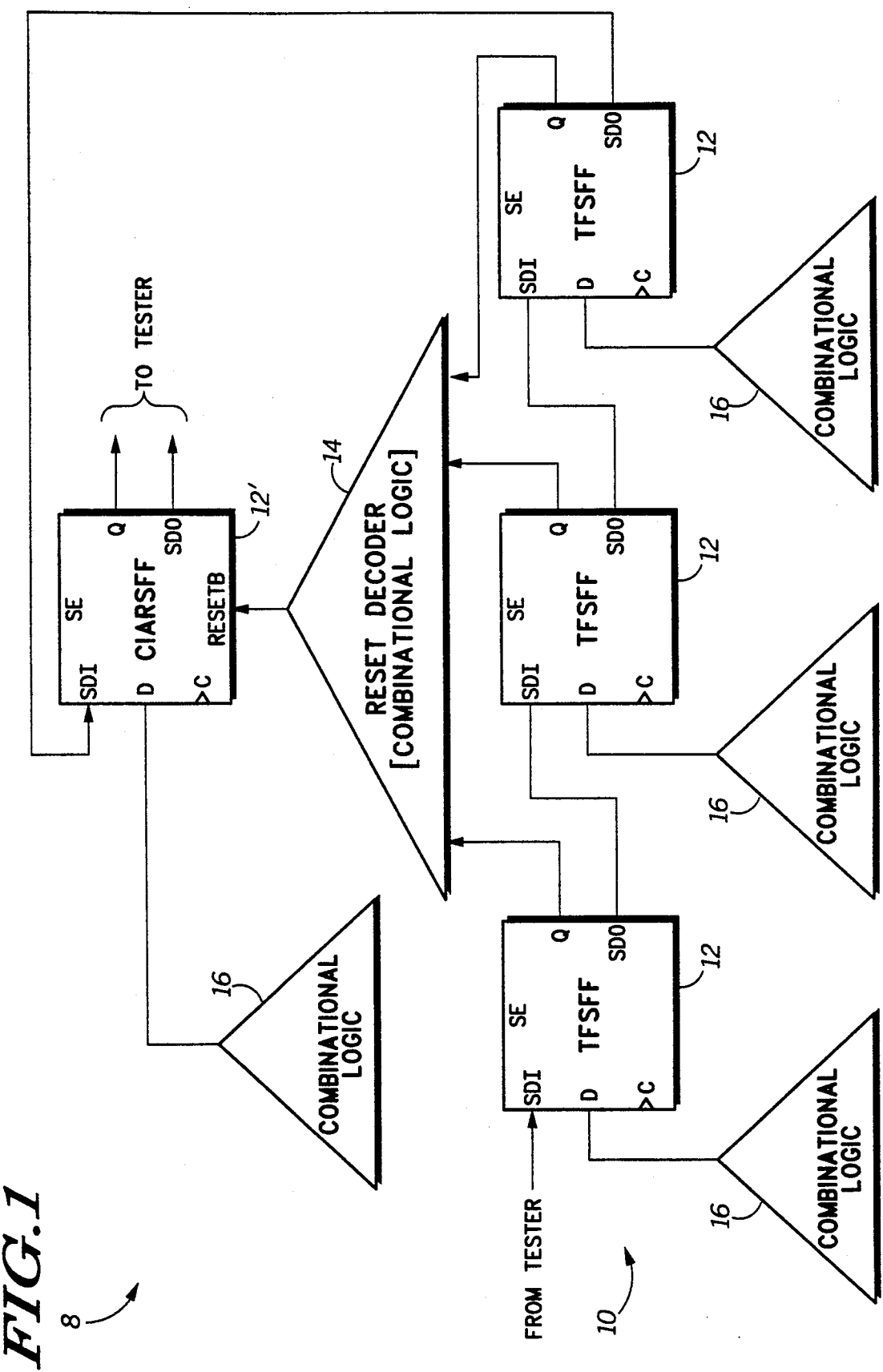
FIG. 1 is a block diagram of a scan system using a Toggle-Free Scan Flip-Flop (TFSFF) according to a preferred embodiment of the present invention.

Shown in FIG. 1 is a block diagram of a scan system 8 comprising a scan path 10, reset decoder combinational logic block 14, and a set of combinational logic blocks 16. Scan path 10 comprises a set of Toggle-Free Scan Flip-Flops (TFSFF) 12, and Clock Inhibiting Asynchronously Resetable Scan Flip-Flop (CIARSFF) 12'. Each of the combinational logic blocks 16 provides a D input to the TFSFF 12. In the scan test mode, the TFSFF 12 shift in a scan test vector, from a conventional tester (not shown), via the Scan Data-In (SDI) terminal. The scan test vector is clocked through the TFSFF 12, in the scan path 10, from the SDI terminal and out the Scan-Data-Out (SDO) terminal, without affecting the parallel system output Q. Consequently, the reset decoder combinational logic 14 is unaffected by the loading of the test vector, during the test mode scan operation. In accordance with conventional scan path operation, the shift sequence is followed by exactly one clock period of normal parallel system operation to "capture" the system logic response to the input scan vector. During this "capture" interval, the TFSFF 12 automatically update the Q outputs with the data from the SDI terminal, at the precise time to optimize the testing of the reset decoder combinational logic 14 (target logic).

Figure 2:
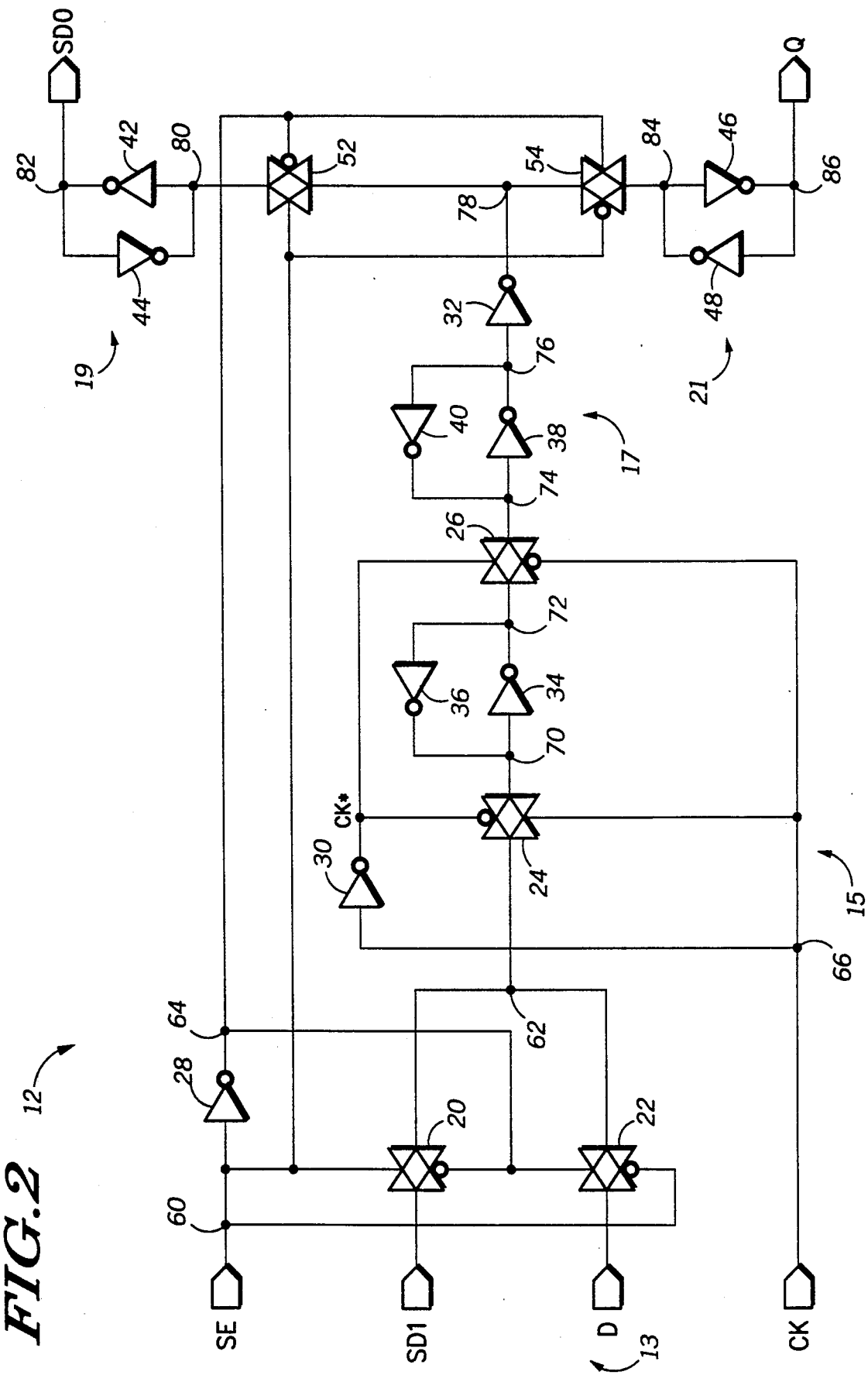
FIG. 2 is a logic diagram of a TFSFF in accordance with the present invention.

Shown in FIG. 2 is a logic schematic of a Toggle-Free Scan Flip-Flop (TFSFF) 12 according to a preferred embodiment of the present invention. The TFSFF 12 is comprised generally of a scan MUX 13, a first master latch 15, a first slave latch 17, a first alternate slave latch 19, a second alternate slave latch 21, and an inverter 32. Scan MUX 13 comprises a transmission gate 20, a transmission gate 22, and an inverter 28. Latch 15 comprises inverters 34, and 36, and a transmission gate 24. Latch 17 comprises inverters 38, and 40, and a transmission gate 26. Latch 19 comprises inverters 42, and 44, and a transmission gate 52. Latch 21 comprises inverters 46 and 48, and a transmission gate 54. Transmission gates 20, 22, 24, 26, 52 and 54, and inverters 28, 30, 32, 34, 36, 38, 40, 42, 44, 46 and 48, can be, for example, conventional CMOS devices.

Gates 24 and 26 each have true and inverted clock inputs, and first and second terminals. Signals received by the true and inverted clock inputs are complements of each other. When the true clock input is a logic high, a conductive path is formed between the first and second terminals. Otherwise an open circuit is provided between the first and second terminals. In FIG. 2, the clock signal (CK) is inverted by inverter 30 to provide the complementary clock signal. Accordingly, the true and complement inputs of gate 24 receive a signal CK and complement thereof, respectively, whereas the inverted and true clock inputs of gate 26 receive signal CK and complement thereof, CK*, respectively. Consequently, when CK is a logic high, gate 24 is conducting and gate 26 is non-conducting, and when CK is a logic low, gate 26 is conducting, and gate 24 is non-conducting.

Gates 20, 22, 52 and 54 each have true and inverted scan enable inputs, and first and second terminals. Signals received by the true and inverted scan enable inputs are complements of each other. When the true scan enable (SE) input is a logic high, a conductive path is formed between the first and second terminals. Otherwise, an open circuit is provided between the first and second terminals. Accordingly, the true and inverted scan enable inputs of transmission gates 20 and 52 receive a signal SE and complement thereof, respectively, whereas the inverted and true scan enable inputs of transmission gates 22 and 54 receive signal SE and complement thereof, respectively. Consequently, when SE is a logic high, gates 20 and 52 are conducting, and gates 22 and 54 are non-conducting, and when SE is a logic low, gates 22 and 54 are conducting, and gates 20 and 52 are non-conducting.

Gate 20 has a first terminal for receiving a scan data input signal (SDI), and a second terminal connected to node 62. Gate 22 has a first terminal for receiving a normal system data input signal (D), and a second terminal connected to node 62. Inverter 28 has an input connected to node 60 for receiving a scan enable (SE) input signal, and an output connected to a node 64. Inverter 30 has an input connected to a node 66 for receiving a clock signal (CK), and an output. Inverter 34 has an input connected to a node 70, and an output connected to a node 72. Inverter 36 has an input connected to output of inverter 34, and an output connected to the input of inverter 34. Transmission gate 24 has a first terminal connected to node 62, and a second terminal connected to node 70. Transmission gate 26 has a first terminal connected to the output of inverter 34, and a second terminal connected to a node 74. Inverter 38 has an input connected to node 74, and an output connected to a node 76. Inverter 40 has an input connected to output of inverter 38 and an output connected to the input of inverter 38. Inverter 32 has an input connected to the output of inverter 38 (node 76), and an output connected to a node 78.

Transmission gate 52 has a first terminal connected to node 78, and a second terminal connected to a node 80. Inverter 42 has an input connected to node 80, and an output connected to a node 82 for providing a scan data output (SDO) signal. Inverter 44 has an input connected to the output of inverter 42, and an output connected to node 80. Transmission gate 54 has a first terminal connected to node 78, and a second terminal connected to a node 84. Inverter 46 has an input connected to node 84, and an output connected to a node 86 for providing an output signal Q. Inverter 48 has an input connected to the output of inverter 46, and an output connected to node 84.

In the preferred embodiment, the latches 15 and 17, and transmission gates 24 and 26 form a conventional negative-edge-triggered D flip-flop with latch 15 being a master and latch 17 a slave. In accordance with the present invention, there are two alternate slave latching portions 19 and 21, which are selectively updated by the master latch 15 based upon the logic state of the scan enable (SE) signal. Thus, the SE signal controls both the front end scan MUX 13, and the selection between the first and second alternate slave latches 19 and 21.

In the case where signal SE is a logic high, transmission gates 20 and 52 are conducting, and transmission gates 22 and 54 are non-conducting, therefore, SDI signal is passed to node 62. When signal CK is a logic high, the CK signal is inverted by inverter 30, therefore, transmission gate 24 is conducting, and transmission gate 26 is non-conducting. Consequently, the signal SDI at node 62 is clocked into the master latch 15, inverted by inverter 34, and reinverted to its original polarity by inverter 36. Since transmission gate 24 is conducting, and transmission gate 26 is non-conducting, the SDI signal is now latched in the master latch 15. Latch 17 remains unaffected until signal CK switches to a logic low, thereby causing transmission gate 24 to become non-conducting, and transmission gate 26 to become conducting.

When signal CK switches to a logic low, the SDI signal is passed to node 74, and latched by the slave latch 17. The SDI signal is then inverted by inverter 32, and the output of inverter 32 (complementary signal, SDI*) appears at node 78. Since transmission gate 52 is in a conducting state, the SDI* signal is passed to the first alternative slave latch 19. The output of inverter 42, SDI is latched and appears on the output node 82 as the scan data output (SDO). This shifting sequence continues for a predetermined interval, until the entire scan test vector is loaded into the TFSFF 12 in scan path 10.

The shifting sequence is followed by a "capture" interval during which the parallel Q of the output of the TFSFF 12 is updated with the data received at the SDI terminal. The capture interval occurs in response to the transition of the SE signal from a logic high state to a logic low state, which occurs contemporaneously with the clock of the slave latch 17. During the capture period, the combinational logic blocks 16 provide a set of normal system data outputs, in response to a set of normal system data inputs. The outputs from combinational logic blocks 16 are coupled to the D input of TFSFF's 12. The transition of SE to a logic low, during the capture interval, causes transmission gate 22 to become conducting and transmission gate 20 non-conducting. Consequently, the data at the D input is passed to node 62, and clocked into the master latch 15. Accordingly, TFSFF 12 captures the machine state (D) of the combinational logic block 16 for one clock period. Once the D input is captured, SE switches to a logic high state, thereby initiating another scan sequence.

Figure 3:
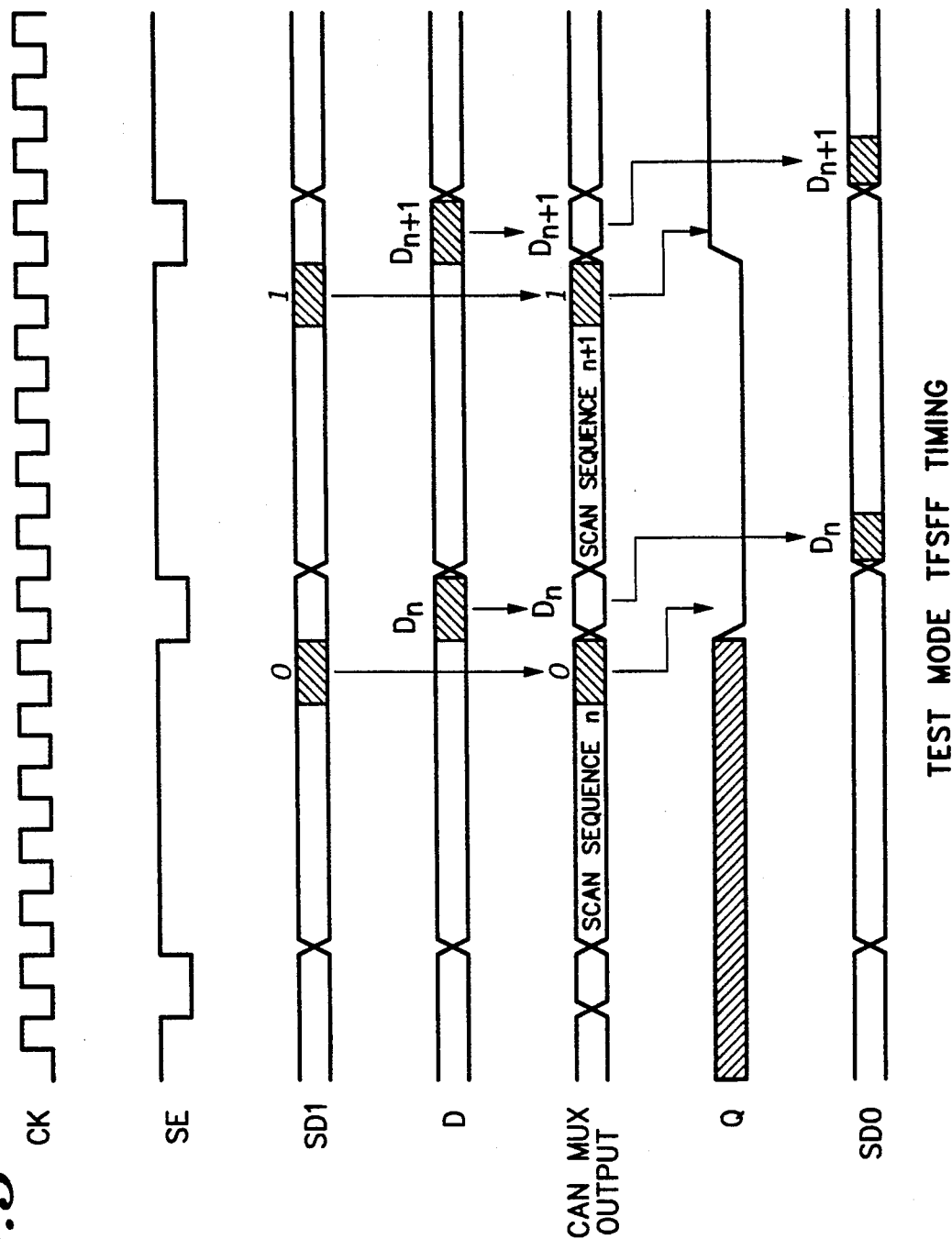
FIG. 3 is a timing diagram for a TFSFF operating in the scan test mode.

Shown in FIG. 3 is a timing diagram of signals CK, SE, SDI, SDO, D, Q and the scan MUX 13 output (node 62), during test mode operation. The timing diagram illustrates the operation of each of a plurality of TFSFF's 12 in the scan path 10 during a scan sequence n, and scan sequence n+1. In the scan test mode, SE signal is at a logic high, which causes the scam MUX 13 to couple the scan data at the SDI input to scan MUX output node 62. When SE switches to a logic low, the scan sequence n terminates, and transmission gate 54 transfers the latch output data (SDI*) to the second alternate slave latch 21, which in turn provides the parallel output signal Q. After the one clock period, SE switches from a logic low to a logic high. Since SE is a logic high state, transmission gate 52 transfers the latch output data $D_n$ to the first alternate slave latch 19, which provides the SDO signal, and thereby captures the machine state $D_n$.

The reset decoder logic 14 receives the set of Q output signals from the TFSFF 12. CIARSFF 12' captures from its RESET terminal, the results of the test performed on the reset decoder logic 14. If the test results do not create a RESET condition, the TFSFF 12 will resume the shift sequence, observing every bit in the scan path 10 while shifting in the next input scan vector. If however, the test performed on the reset decoder logic 14 causes a RESET signal, the resumption, by the TFSFF 12, of the shifting sequence will not remove the RESET causing condition from the Q output of the TFSFF 12. In order to remove the RESET causing condition from the Q output of the TFSFF 12, a RESET negating condition must be scanned into the TFSFF12. All TFSFF 12 in scan path 10 must be located at an ordinal positions closer to the scan path's 10 scan input (SDI) than any CIARSFF 12' in the scan path 10'. This requirement insures that none of the TFSFF 12 in scan path 10 can provide a reset stimulus to a CIARSFF 12' that precedes them (ordinally) in the scan path 10.

Figure 4:
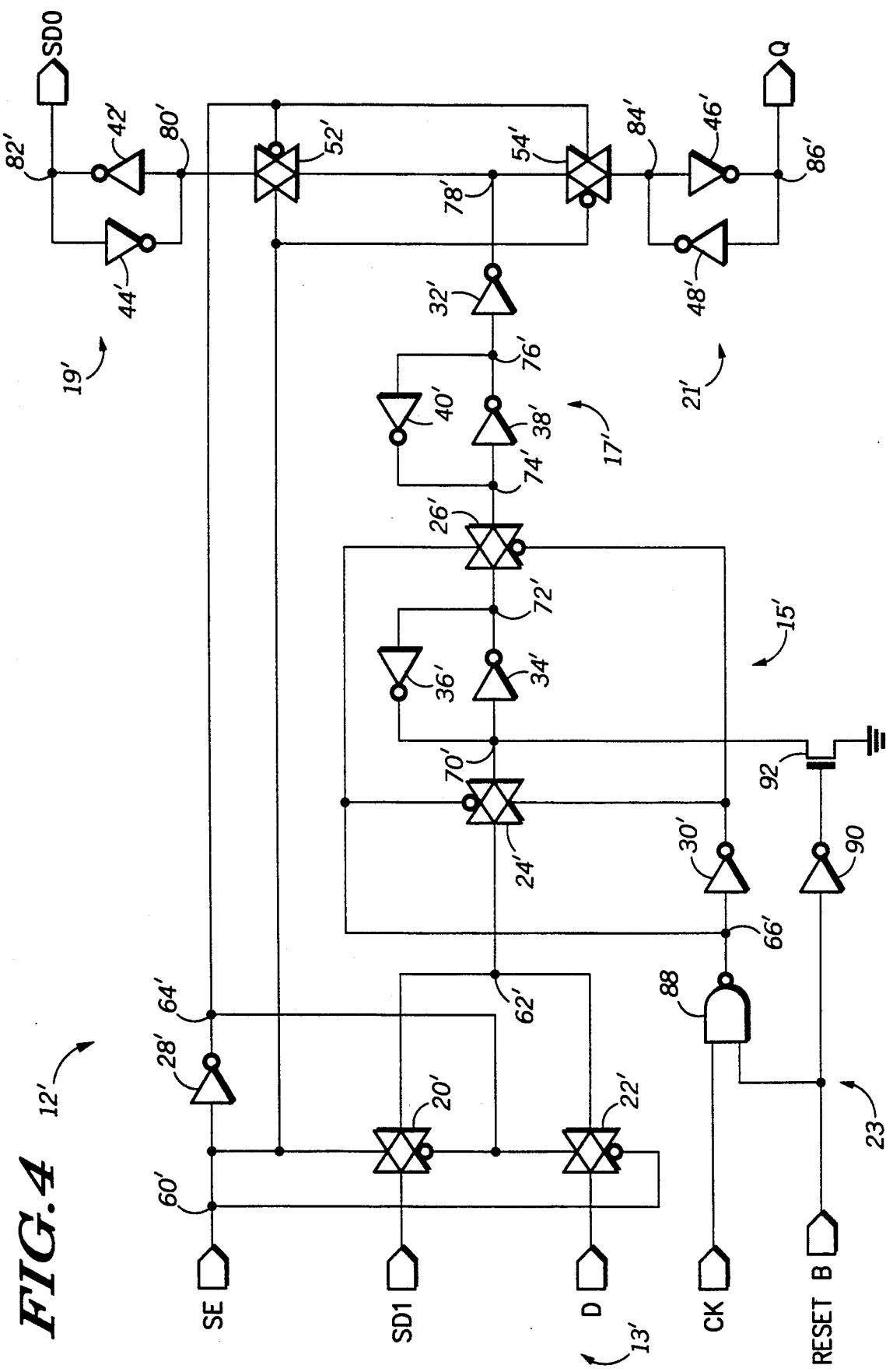
FIG. 4 is a logic diagram of a Clock Inhibiting Asynchronously Resetable Scan Flip-Flop (CIARSFF) for use with the TFSFF.

Shown in FIG. 4 is a logic schematic of a CIARSFF 12' in accordance with a preferred embodiment of the present invention. CIARSFF 12' is also a toggle-free scan flip-flop, and is comprised generally of a scan MUX 13', a first master latch 15', a first slave latch 17', a first alternate slave latch 19', and a second alternate slave latch 21', clock inhibiting logic 23, and an inverter 32'. Scan MUX 13' comprises transmission gates 20', and 22', and an inverter 28'. Latch 15' comprises inverters 34', and 36', and a transmission gate 24'. Latch 17' comprises inverters 38', and 40', and a transmission gate 26'. Latch 19' comprises inverter 42', and 44', and a transmission gate 52'. Latch 21' comprise inverter 46, and 48', and a transmission gate 54'. Clock inhibiting logic 23 comprises a NAND gate 88, inverter 90, and N channel transistor 92. NAND gate 88 has a first input for receiving a clock (CK) signal, and a second input for a complementary RESET signal (RESETB), and an output coupled to node 66'. Inverter 90 has an input for receiving the RESETB signal and an output. Transistor 92 has a gate coupled to the output of inverter 90, a drain connected to node 70', and a source connected to a negative power supply terminal, shown as ground. Once again, the transmission gates, inverters and NAND gate can be, for example, conventional CMOS transmission gates.

During test mode scan operation, CIARSFF 12' operates in the same manner as TFSFF 12. Accordingly, CIARSFF 12' receives scan data via the SDI terminal, and provides scan output data via the SDO output, without affecting the system data output Q. CIARSFF 12' is, however, asynchronously setable or resetable. The following description pertain to asynchronous RESETs of the CIARSFF 12', however, it should be obvious to one of ordinary skill in the art that the CIARSFF 12' may be asynchronously "set" by including a SET terminal. During the capture interval, when SE switches to a logic low state, CIARSFF 12' captures from the RESET terminal the results of the test performed on the reset decoder logic 14. Since SE is a logic low, transmission gate 22' coupled the D input to node 62'. If the test results do not create a reset condition, the signal at RESETB is a logic high, and NAND gate 88 does not inhibit the clock signal to the master latch 15'. When the CK signal switches to a logic high, the D input is clocked into master latch 15'. When Ck signal switches to a logic low, the D input is clocked into the slave latch 17'. The transition of the CK signal to a logic low occurs contemporaneously with the transition of SE from a logic low to a logic high state. Consequently, the D input data is passed into the first alternate slave latch 19', without affecting the parallel Q output, and the SDO is shifted out of the CIARSFF 12' to the tester (not shown).

If the test results create a reset condition, CIARSFF 12' captures from the RESETB terminal the results of the test performed on the reset decoder logic 14. Since the capture interval occurs when SE is a logic low, transmission gate 22' couples the D input to node 62', as previously described. Due to the reset causing condition, RESETB is a logic low, therefore, NAND gate 88 inhibits the clock signal by providing a logic high output at node 66', regardles of the logic state of the CK signal. As a result, transmission gate 24' receives a logic high signal at its complementary input, and inverter 30' operates to provide a logic low signal at the true input of transmission gate 24', therefore, transmission gate 24' is non-conducting. The RESETB signal is inverted by inverter 90, which provides a logic high voltage to the gate of transistor 92, causing transistor 92 to become conductive, thereby discharging the voltage at node 70. The resumption of the shifting sequence by TFSFF 12 will not remove the reset causing condition from the CIARSFF 12'.

In order to remove the reset causing condition, a reset negating condition is scanned into the TFSFF 12. In using the TFSFF 12, in accordance with the present invention, the amount of data required to rectify the reset causing condition is minimized, since only sufficient data to reach the TFSFF 12 is required, as opposed to a bit for every bit in the scan path. Accordingly, once the reset negating condition is clocked into the TFSFF 12, the SE signal transitions to a logic low state, for a capture period, thereby updating the Q output of the TFSFF 12, as described above. The reset negating condition is provided to the reset decoder logic 14 by the Q output. The negation of the reset causing condition, causes the RESETB signal to switch to a logic high. NAND gate 88 receives the logic high RESETB signal and the CK signal, and provides an output at node 66' which is a function of the logic state of the CK signal. The RESETB signal is inverted by inverter 90, which provides a logic low voltage at the gate of transistor 92, thereby causing transistor 92 to become non-conductive. Thus, the clock inhibiting condition is removed, as a result of the reset negating condition.

While the scan path 10 is being clocked to scan in the reset negating condition, there occurs some loss of scan output data (SDO) due to the continued presence of the reset causing condition at CIARSFF 12'. Since the CIARSFF 12' captured the test response of the reset decoder logic 14 during the capture interval, the test response is preserved in the CIARSFF 12', until the reset causing condition has been rectified. Upon rectification of the reset causing condition, the test response is shifted out of the CIARSFF 12' to the tester (not shown). Thus, the rule respecting the ordinally of the scan path bits is necessary to ensure that the latched reset causing condition can not interfere with attempts to negate the reset causing condition.

While the invention has been described in a preferred embodiment, it will be apparent to those skilled in the art that the disclosed invention may be modified in numerous ways and may assume many embodiments other than that specifically set out and described above. For example, the TFSFF 12 may be a positive-edge triggered D scan flip-flop. Furthermore, the slave latch 17 may be omitted from the TFSFF 12 such that the master latch 15 provides a latch data output signal directly to first alternate slave latch 19, in response to SE being a logic high, and alternatively, provides the latch data output signal directly to the second alternate slave latch 21, in response to SE being a logic low. The CIARSFF 12' may be modified such that the normal system data, and the scan data are provided by the same output.

An alternate use of the present invention allows the testing of delay faults, as opposed to the "stuck at" faults. Under the single stuck fault assumption, a single n-input gate has 2(n+1) potential faults, including a stuck high and a stuck low fault on the output and on each input. All of these faults can be detected by n+1tests. The delay fault is a condition under which the propagation delay through the logic under test exceeds the system clock interval. Unlike a stuck at fault, which requires only a single test vector to detect the occurrence of a stuck high fault or a stuck low fault, a delay fault requires two vectors (vector pair) to test for the delay fault condition. Under the delay fault model, the scan path 10 requires a transitional edge, to effectuate the application of the second scan test vector. Standard scan techniques do not accommodate this test requirement, because in the delay fault model, the fault condition must be provoked by a transition (rise or fall).

This phenomenon is unlike the stuck at fault condition, where the objective is to detect a static condition (i.e., stuck high). Since, in the delay fault model, the scan path 10 requires a transitional edge to effectuate the application of the second scan test vector, the test result of the first vector must be retained, during the interval in which the second vector is shifted into the scan path 10.

The testing for delay faults requires the TFSFF 12 to administer two consecutive test vectors to the combinational logic 16 under test. The combinational logic 16 under test may be any logic block, as opposed to reset decoder logic. Thus, in the scan test mode, the TFSFF's 12 shifts in the first scan test vector, from a conventional tester, in the manner described above. Once again, the first scan test vector is clocked through the TFSFF 12 without affecting the parallel system output Q. Once the first test vector is loaded into scan path 10, the SE signal switches states, thereby applying the test vector to the combinational logic under test. The transition of the SE signal from a first logic state to a second logic state (for example, from a logic low to a logic high state), initiates the shifting sequence for the second test vector. Accordingly, the second test vector is clocked through the TFSFF's 12, without affecting the parallel outputs Q, which currently stores the first test vector. Once the second test vector is loaded into scan path 10, the SE signal switches states again, thereby causing the application of the second test vector to the combinational logic under test. During the capture interval, the test response is shifted out of the CIARSFF 12' to the tester. Accordingly, it is intended by the appended claims to cover all modifications of the invention which fall within the trus spirit and scope of the invention.

We claim:

1. A toggle-free scan flip-flop, comprising:
   latching means, having a master latch circuit and a slave latch circuit, wherein said master latch circuit has an input for receiving a data input signal, in response to a first clock signal switching to a first logic state, and an output, connected to an input of said slave latch circuit, for storing an output bit signal in response to said first clock signal switching to a second logic state, said slave latch circuit having an output for providing a latch data output signal, in response to said first clock signal switching to said second logic state;
   multiplexing means, coupled to said latching means, for selectively providing said data input signal to said latching means, in response to a control signal, said multiplexing means, operable in a first mode of operation, for coupling a scan data input signal to said latching means, and operable in a second mode of operation, for coupling a system data input signal to said latching means, said first mode of operation and said second mode of operation being determined by the logic state of said control signal; and
   switching means, coupled to said multiplexing means and said latching means, for selectively transferring said latch data output signal from said slave latch circuit to an input of a first alternate slave latch, in response to said control signal having a first logic value, and for transferring said latch data output signal from said slave latch circuit to an input of a second alternate slave latch, in response to said control signal having a second logic value;

whereby, in said first mode of operation, wherein said scan data input signal is clocked through said latching means and provided at an output of said first alternate slave latch, the value stored by said second alternate slave latch does not toggle, and in said second mode of operation, wherein said system data input signal is clocked through said latching means and provided at an output of said second alternate latch, the value stored by said first alternate slave latch does not toggle.

2. The toggle-free scan flip flop according to claim 1 wherein said switching means updates the value stored by said first alternate slave latch with said latch data output signal, when said toggle-free scan flip-flop is in a scan mode of operation, and said switching means updates the value stored by said second alternate slave latch with said latch output data signal, when said toggle-free scan flip-flop is in a data mode of operation.

3. The toggle-free scan flip-flop according to claim 2 wherein said latching means is a master-slave clocked flip-flop, and said first clock signal switches to said second logic state contemporaneously with the transition of said control signal from a first logic state to a second logic state.

4. The toggle-free scan flip-flop according to claim 1 further comprising clock inhibiting means, coupled to said latching means, for negating a reset causing condition by providing a clock inhibit signal to said master latch circuit, thereby preventing said master latch circuit from receiving said input data signal.

5. The toggle-free scan flip-flop according to claim 4 wherein said multiplexing means comprises:
   a first inverter having an input for receiving said control signal, and an output connected to a first node;
   a first switch for coupling said scan data input signal to an input node, when said control signal is in a first logic state; and
   a second switch for coupling said system data input signal to said input node, when said control signal is in a second logic state.

6. The toggle-free scan flip-flop according to claim 5 wherein said latching means comprises:
   a first latch having an input coupled to said input node, for receiving a data input signal, and an output;
   a second latch having an input coupled to said output of said first latch and an output coupled to a second node, for providing a latch data output signal;
   a third switch for coupling an input signal at said input node to the input of the first latch when said clock signal is in a first logic state;
   a fourth switch for coupling said output of said first latch to said input of said second latch when said clock signal is in a second logic state;
   a second inverter having an input for receiving said clock signal, and an output for providing a complementary clock signal to said third and said fourth switches; and
   a third inverter having an input coupled to the output of said second latch, and an output coupled to a fourth node.

7. The toggle-free scan flip-flop according to claim 6 wherein said switching means comprises:
   a third latch having an input coupled to said fourth node, and an output for providing a scan data output signal;
   a fourth latch having an input coupled to said fourth node, and an output for providing a system data output signal;
   a fifth switch for coupling the output of the third inverter to the input of said third latch, when said control signal is in said first logic state; and
   a sixth switch for coupling the output of the third inverter to the input of said fourth latch, when said control signal is in said second logic state.

8. The toggle-free scan flip-flop according to claim 7 wherein said first, second, third, fourth, fifth and sixth switches are CMOS transmission gates having a true and an inverted input.

9. The toggle-free scan flip-flop according to claim 8 wherein said clock inhibiting means comprises:
   a NAND gate having a first input for receiving to said clock signal, a second input for receiving a reset signal, and an output;
   a fourth inverter having an input connected to said second input of said NAND gate, and an output;
   a first transistor having a control electrode connected to the output of said fourth inverter, a first current electrode connected to the input of said first latch, and a second current electrode connected to a negative power supply terminal; and
   a fifth inverter having an input connected to said output of said NAND gate, and an output connected to said true input of said third switch.

10. A toggle-free scan flip-flop, comprising:
   a first inverter having an input for receiving a control signal, and an output connected to a first node;
   a first switch for coupling a first input signal to an input node when said control signal is in a first logic state;
   a second switch for coupling a second input signal to said input node when said control signal is in a second logic state;
   a first latch having an input coupled to said input node, for receiving a data input signal, and an output;
   a second latch having an input coupled to said output of said first latch and an output coupled to a second node, for providing a latch data output signal;
   a third switch for coupling an input signal at said input node to the input of the first latch when said clock signal is in a first logic state;
   a fourth switch for coupling said output of a first latch to said input of said second latch when said clock signal is in a second logic state;
   a second inverter having an input for receiving said clock signal, and an output for providing a complementary clock signal to said third and said fourth switches;
   a third inverter having an input coupled to the output of said second latch, and an output coupled to a fourth node;
   a third latch having an input coupled to said fourth node, and an output for providing a first output signal;
   a fourth latch having an input coupled to said fourth node, and an output for providing a second output signal;
   a fifth switch for coupling the output of the third inverter to the input of said third latch when said control signal is in said first logic state; and
   a sixth switch for coupling the output of the third inverter to the input of said fourth latch when said control signal is in said second logic state.

11. The toggle-free scan flip-flop according to claim 10 wherein the first, second, third, fourth, fifth and sixth switches are CMOS transmission gate.

12. The toggle-free scan flip-flop according to claim 11 wherein the first and second latches are clocked CMOS latches.

13. The toggle-free scan flip-flop according to claim 12 wherein said control signal changes states contemporaneously with the transition of said clock signal.

14. The toggle-free scan flip-flop according to claim 13 wherein said second latch provides said latch data output signal to said third latch in response to said fifth switch being turned on, in a first mode of operation, and provides said latch data output signal to said fourth latch in response to said sixth switch being turned on, in a second mode of operation.

15. The toggle-free scan flip-flop according to claim 14 wherein said first mode of operation occurs in response to said control signal being in said first logic state, and said second mode of operation occurs in response to said control signal being in said second logic state.

16. A toggle-free scan flip-flop, for selectively toggling a first parallel output during a test mode scan operation, and for selectively setting or resetting a data bit stored at a second parallel output during a data mode operation, said scan path flip-flop comprising:
 master-slave latching means, operable in a first mode of operation, for receiving a scan data bit input signal at an input of said master-slave latching means, during a first clock cycle, and for providing a latch data bit output signal, equivalent to said scan data bit input signal, as an output of said master-slave latching means, during a second clock cycle, said master-slave latching means being operable in a second mode of operation, for receiving a system data bit input signal at said input of said master-slave latching means, during said first clock cycle, and providing said latch data bit output signal, equivalent to said system data bit input signal, as an output of said master-slave latching means, curing said second clock cycle;
 multiplexing means, coupled to said master-slave latching means, for coupling said scan data bit input signal to said master-slave latching means, when a control signal is in a first logic state, and for coupling said system data bit input signal to said master-slave latching means, when said control signal is in a second logic state;
 selection means, coupled to said multiplexing means said master-slave latching means, for selectively coupling said latch data bit output signal to said first parallel output, when said control signal is in said first logic state, and coupling said latch data bit output signal to a second alternate slave, when said control signal is in said second logic state; and
 clock inhibiting means, coupled to said latching means, for negating a reset causing condition by providing a clock inhibit signal to said master-slave latching means, thereby preventing said master-slave latching means from receiving said scan data bit input signal.

17. The toggle-free scan flip-flop according to claim 16 wherein said multiplexing means comprises:
 a first inverter having an input for receiving said control signal, and an output connected to a first node;
 a first switch for coupling said scan data signal to an input node, when said control signal is in a first logic state; and
 a second switch for coupling said system data input signal to said input node, when said control signal is in a second logic state.

18. The toggle-free scan flip-flop according to claim 17 wherein said master-slave latching means comprises:
 a first latch having an input coupled to said input node, for receiving a data input signal, and an output;
 a second latch having an input coupled to said output of said first latch and an output coupled to a second node, for providing a latch data output signal;
 a third switch for coupling an input signal at said input node to the input of the first latch when a clock signal is in a first logic state;
 a fourth switch for coupling said output of said first latch to said input of said second latch when said clock signal is in a second logic state;
 a second inverter having an input for receiving said clock signal, and an output for providing a complementary clock signal to said third and said fourth switches;
 a third inverter having an input coupled to the output of said second latch, and an output coupled to a fourth node.

19. The toggle-free scan flip-flop according to claim 18 wherein said switching means comprises:
 a third latch having an input coupled to said fourth node, and an output for providing a first output signal;
 a fourth latch having an input coupled to said fourth node, and an output for providing a second output signal;
 a fifth switch for coupling the output of the third inverter to the input of said third latch when said control signal is in said first logic state; and
 a sixth switch for coupling the output of the third inverter to the input of said fourth latch when said control signal is in said second logic state.

20. The toggle-free scan flip-flop according to claim 19 wherein said first, second, third, fourth, fifth and sixth switches are CMOS transmission gates having a true and an inverted input.

21. The toggle-free scan flip-flop according to claim 20 wherein said clock inhibiting means comprises:
 a NAND gate having a firt input for receiving to said clock signal, a second input for receiving a reset signal, and an output;
 a fourth inverter having an input connected to said second input of said NAND gate, and an output;
 a first transistor having a control electrode connected to the output of said fourth inverter, a first current electrode connected to the input of said first latch, and a second current electrode connected to a negative power supply terminal; and
 a fifth inverter having an input connected to said output of said NAND gate, and an output connected to said true input of said third switch.

22. A toggle-free scan flip-flop, comprising:
 latching means for receiving a data input signal, and for providing a latch data output signal, said latching means comprising a first slave latch, and a second slave latch;
 multiplexing means, coupled to said latching means, for selectively providing said data input signal to said latching means, in response to a control signal, said multiplexing means, operable in a first mode of operation, for coupling a scan data input signal to said latching means, and operable in a second mode of operation, for coupling a system data input signal to said latching means, said first mode of operation and said second mode of operation being determined by the logic state of said control signal; and switching means, coupled to said multiplexing means and said latching means, for selectively transferring said latch data output signal from said latching means to said first slave latch, in response to said control signal being in said first logic state, and for transferring said latch data output signal from said latching means to an input of said second slave latch, in response to said control signal being in said second logic state;

whereby, in said first mode of operation, wherein said scan data input signal is clocked through said latching means and provided at an output of said first slave latch, the value stored by said second slave latch does not toggle, and in said second mode of operation, wherein said system data input signal is clocked through said latching means and provided at an output of said second slave latch, the value stored by said first slave latch does not toggle.

23. The toggle-free scan flip-flop according to claim 22 further comprising clock inhibiting means, coupled to said latching means, for negating a reset causing condition by providing a clock inhibit signal to said latching means, thereby preventing said latching means for receiving said input data signal.

24. The toggle-free scan flip-flop according to claim 23 wherein said multiplexing means comprises:
a first inverter having an input for receiving said control signal, and an output connected to a first node;
a first switch for coupling said scan data input signal to a latch input node, when said control signal is in a first logic state; and
a second switch for coupling said system data input signal to said latch input node, when said control signal is in a second logic state.

25. The toggle-free scan flip-flop according to claim 24 wherein said latching means comprises:
a first latch having an input coupled to said input node, for receiving a data input signal, and an output;
a third switch for coupling an input signal at said input node to the input of the first latch when a clock signal is in a first logic state;
a second latch having an input coupled to the output of said first latch, and an output for providing a scan output signal;
a fourth switch for coupling the output of said first latch to said input of said second latch when said clock signal is in a second logic state;
a second inverter having an input for receiving said clock signal, and an output for providing a complementary clock signal to said third and said fourth switches;
a third inverter having an input coupled to the output of said second latch, and an output coupled to a fourth node.

26. The toggle-free scan flip-flop according to claim 25 wherein said switching means comprises:
a third latch having an input coupled to said fourth node, and an output for providing a first output signal;
a fourth latch having an input coupled to said fourth node, and an output for providing a second output signal;
a fifth switch for coupling the output of the third inverter to the input of said third latch when said control signal is in said first logic state; and
a sixth switch for coupling the output of the third inverter to the input of said fourth latch when said control signal is in said second logic state.

27. The toggle-free scan flip-flop according to claim 26 wherein said first, second, third, fourth, fifth and sixth switches are CMOS transmission gates having a true and an inverted input.

28. The toggle-free scan flip-flop according to claim 27 wherein said clock inhibiting means comprises:
a NAND gate having a first input for receiving to said clock signal, a second input for receiving a reset signal, and an output;
a fourth inverter having an input connected to said second input of said NAND gate, and an output;
a first transistor having a control electrode connected to the output of said fourth inverter, a first current electrode connected to the input of said first latch, and a second current electrode connected to a negative power supply terminal; and
a fifth inverter having an input connected to said output of said NAND gate, and an output connected to said true input of said third switch.

* * * * *